(12) United States Patent
Kim et al.

(10) Patent No.: US 10,472,254 B2
(45) Date of Patent: Nov. 12, 2019

(54) APPARATUS AND METHOD FOR ANALYZING INFLUENCE VARIABLE ON MEMBRANE FOULING OF SEAWATER DESALINATION SYSTEM

(71) Applicant: DOOSAN HEAVY INDUSTRIES & CONSTRUCTION CO., LTD., Gyeongsangnam-do (KR)

(72) Inventors: Seongjoon Kim, Seoul (KR); Jonghyuk Moon, Seoul (KR); Sungju Park, Gyeonggi-do (KR); Juwon Hwang, Gyeonggi-do (KR)

(73) Assignee: Doosan Heavy Industries Contstruction Co., Ltd, Gyeongsangnam-do (KR)

( * ) Notice: Subject to any disclaimer, the term of this patent is extended or adjusted under 35 U.S.C. 154(b) by 200 days.

(21) Appl. No.: 15/702,669

(22) Filed: Sep. 12, 2017

(65) Prior Publication Data
US 2018/0072588 A1 Mar. 15, 2018

(30) Foreign Application Priority Data
Sep. 12, 2016 (KR) .................. 10-2016-0117376

(51) Int. Cl.
*C02F 1/00* (2006.01)
*B01D 21/00* (2006.01)
(Continued)

(52) U.S. Cl.
CPC .......... *C02F 1/008* (2013.01); *B01D 21/0084* (2013.01); *B01D 61/022* (2013.01);
(Continued)

(58) Field of Classification Search
None
See application file for complete search history.

(56) References Cited

U.S. PATENT DOCUMENTS 4,772,385 A * 9/1988 Yamada ................. B01D 61/12
210/87
2008/0082181 A1 4/2008 Miller

FOREIGN PATENT DOCUMENTS

KR     10-0811199 B1      3/2008
KR  10-2011-0068817 A    6/2011
(Continued)

OTHER PUBLICATIONS

Minjeong Kim et al: Prediction and Identification of Membrane Fouling Mechanism in a Membrane Bioreactor Using a Combined Mechanistic Model 11.
(Continued)

*Primary Examiner* — Mohammad Ali
*Assistant Examiner* — Saad M Kabir
(74) *Attorney, Agent, or Firm* — INVENSTONE Patent, LLC (57) ABSTRACT

This disclosure relates to an apparatus and method for analyzing an influence variable on membrane fouling of a seawater desalination system, wherein influence variables other than variables having a low degree of influence, among variables affecting the membrane, are selected, and the influence thereof on membrane fouling is used to derive an equation. The apparatus includes a variable storage unit configured to store variables affecting membrane fouling of a seawater desalination system, a dominant variable selection unit configured to select at least one dominant variable among the variables through at least one algorithm, and an equation derivation unit configured to derive a specific equation based on a correlation between the selected dominant variable and the membrane fouling.

20 Claims, 4 Drawing Sheets

(51) Int. Cl.
    *B01D 61/02* (2006.01)
    *B01D 61/12* (2006.01)
    *B01D 61/14* (2006.01)
    *B01D 61/22* (2006.01)
    *B01D 61/58* (2006.01)
    *C02F 9/00* (2006.01)
    *G05B 19/042* (2006.01)
    *G06F 17/12* (2006.01)
    *G06F 17/16* (2006.01)
    *G06F 17/18* (2006.01)
    *B01D 61/04* (2006.01)
    *B01D 65/10* (2006.01)
    *G05B 23/02* (2006.01)
    *C02F 1/24* (2006.01)
    *C02F 1/44* (2006.01)
    *C02F 103/08* (2006.01)

(52) U.S. Cl.
    CPC ........... *B01D 61/025* (2013.01); *B01D 61/04* (2013.01); *B01D 61/12* (2013.01); *B01D 61/145* (2013.01); *B01D 61/22* (2013.01); *B01D 61/58* (2013.01); *B01D 65/10* (2013.01); *C02F 9/00* (2013.01); *G05B 19/0426* (2013.01); *G05B 23/0229* (2013.01); *G06F 17/12* (2013.01); *G06F 17/16* (2013.01); *G06F 17/18* (2013.01); *B01D 2311/04* (2013.01); *B01D 2311/2665* (2013.01); *B01D 2321/40* (2013.01); *C02F 1/24* (2013.01); *C02F 1/441* (2013.01); *C02F 1/444* (2013.01); *C02F 2103/08* (2013.01); *C02F 2209/001* (2013.01); *C02F 2209/006* (2013.01); *C02F 2209/02* (2013.01); *C02F 2209/03* (2013.01); *C02F 2209/05* (2013.01); *C02F 2209/06* (2013.01); *C02F 2209/10* (2013.01); *C02F 2209/11* (2013.01); *C02F 2209/20* (2013.01); *C02F 2303/20* (2013.01); *C02F 2303/22* (2013.01); *G05B 2219/23371* (2013.01); *Y02A 20/131* (2018.01)

(56) References Cited

FOREIGN PATENT DOCUMENTS

| | | |
|---|---|---|
| KR | 10-2013-0022132 B1 | 3/2013 |
| KR | 10-2014-0071162 B1 | 6/2014 |
| WO | 2010109265 A | 9/2010 |

OTHER PUBLICATIONS

A Korean Office Action dated Jul. 30, 2018 in connection with Korean Patent Application No. 10-2016-0117376 which corresponds to the above-referenced U.S. application.

\* cited by examiner

APPARATUS AND METHOD FOR ANALYZING INFLUENCE VARIABLE ON MEMBRANE FOULING OF SEAWATER DESALINATION SYSTEM

CROSS-REFERENCE TO RELATED APPLICATION

This application claims the benefit of Korean Patent Application No. 10-2016-0117376, filed Sep. 12, 2016, which is hereby incorporated by reference in its entirety.

BACKGROUND

Conventionally, limitations are imposed on storing a variety of factor variables affecting the membrane fouling of a seawater desalination system owing to the lack of experience in long-term operation of a seawater desalination system. Moreover, how each of the selected factor variables affects the membrane fouling of the seawater desalination system, and what exactly is affected, has not been represented using an objective indicator. Thus, the factor variables affecting the membrane fouling of the seawater desalination system are limited, and not collectively considered.

Also, factors affecting the differential pressure rise of the membrane and operating variables for differential pressure management have been limited only to water-quality factors. Furthermore, the extent of fouling of the membrane due to membrane maintenance, particularly membrane cleaning and replacement, has not been taken into consideration.

BRIEF SUMMARY

An exemplary objective of the present disclosure is to provide an apparatus and method for analyzing an influence variable on membrane fouling of a seawater desalination system, in which influence variables other than variables having a low degree of influence, among variables affecting the membrane, are selected, and the influence thereof on membrane fouling is used to derive an equation.

The present disclosure is not limited to the foregoing, and a variety of other objectives may be incorporated within a range that is apparent to those skilled in the art through the following description.

In an example, an apparatus for analyzing membrane fouling of a seawater desalination system includes: a variable reception unit configured to receive variables affecting membrane fouling of a seawater desalination system collected by a sensor included in the seawater desalination system; a variable storage unit configured to store variables affecting membrane fouling of a seawater desalination system; a dominant variable selection unit configured to select at least one dominant variable among the variables through at least one algorithm; an equation derivation unit configured to derive a specific equation based on a correlation between the selected dominant variable and the membrane fouling; and a variable control unit configured to control the seawater desalination system to control the dominant variable.

In an aspect thereof, the variables may include at least one selected from among a variable measured during an intake process, a variable measured after a UF (Ultra Filtration) process, a variable measured during a DAF (Dissolved Air Flotation) process, a variable measured before an RO (Reverse Osmosis) process, and a variable measured after an RO process.

In another aspect thereof, the algorithm may include at least one selected from among SPI (Single-Predictor Identification), PME (Progressive Model Enhancement), BMA (Bayesian Model Averaging), and GA (Genetic Algorithm).

In still another aspect thereof, the dominant variable selection unit may be configured such that a variable chosen in common by at least two algorithms among SPI (Single-Predictor Identification), PME (Progressive Model Enhancement), BMA (Bayesian Model Averaging) and GA (Genetic Algorithm) is selected as a dominant variable.

In yet another aspect thereof, the equation derivation unit may be configured such that the specific equation is derived based on the correlation for the selected dominant variable and the membrane fouling through the PME algorithm.

In still yet another aspect thereof, the dominant variable selection unit may be configured such that a simple regression model, which describes each dependent variable y for a single feature variable $x_j$ belonging to a feature matrix X for the variables affecting the membrane fouling, is derived through the SPI algorithm, and when a p-value is lower than a preset significance level $\alpha$, the feature variable is selected as an influence variable candidate.

In a further aspect thereof, the dominant variable selection unit may be configured such that a multiple linear regression model, which describes each dependent variable y for a single feature variable $x_j$ belonging to a feature matrix X for the variables affecting the membrane fouling, is derived through the PME algorithm, and a process of sequentially including or excluding the variables affecting the membrane fouling in or from the multiple linear regression model is repeated until an additional improvement in the multiple linear regression model is not obtained, the improvement being determined based on a change in the likelihood of the multiple linear regression model.

In still a further aspect thereof, the dominant variable selection unit may be configured such that a multiple linear regression model, which describes each dependent variable y for a single feature variable $x_j$ belonging to a feature matrix X for the variables affecting the membrane fouling, is described through the BMA algorithm, and a posterior probability of a model produced by $M_k$, which is any subset of feature variables $(x_1, \ldots, x_{(p+q)},$ is derived.

In still yet a further aspect thereof, the dominant variable selection unit may be configured such that a multiple linear regression model, which describes each dependent variable y for a single feature variable $x_j$ belonging to a feature matrix X for the variables affecting the membrane fouling, is derived through the GA algorithm, and an MSE (Mean Squared Error) of a multiple linear regression model residual is input to a fitness function $f(\bullet)$ and a genetic operation process including selection, crossover and mutation is repeated in an initial population $M^p = \{M_1, \ldots, M_g\}$.

In even still yet a further aspect thereof, the dominant variable selected unit may be configured such that, in a set of influence variable candidates $S=(S_{SPI}, S_{PME}, S_{BMA}, S_{GA})$ selected through four algorithms, a set of feature variables included at least H times is defined as $S_{min}$ and a set of feature variables included at least one time is defined as $S_{max}$.

According to an example of the present disclosure, influence variables other than variables having a low degree of influence, among variables affecting the membrane, are selected, and the influence thereof on membrane fouling can be used to derive an equation.

The effects of the present disclosure are not limited to the foregoing, and should be understood to incorporate all effects that can be reasonably inferred from the following description.

DETAILED DESCRIPTION

The foregoing and further aspects are described with reference to the accompanying drawings. It is to be understood that the components of individual embodiments are provided in various combinations in the embodiments, unless otherwise mentioned, or so long as they are not contradictory to each other. Furthermore, the present disclosure may be implemented in various different forms and is not limited to the embodiments described herein.

Throughout the drawings, in order to clearly illustrate the present disclosure, parts not related to the description may be omitted, and the same or like parts are denoted by the same reference numerals throughout the specification. It is also to be understood that when any part is referred to as "comprising" or "including" any element, it does not exclude but may further include other elements unless otherwise stated.

It should also be understood that throughout the specification, when any part is referred to as being "connected" to another part, it may indicate not only being "directly connected" but also being "electrically connected", with a further element being interposed therebetween. Further, in the specification, a "signal" includes a quantity of electricity, such as a voltage or a current.

As used herein, the term "unit" includes a "block configured to change or add a plug-in to a hardware system or a software system", that is, a single component or block that performs a specific function in hardware or software.

The present disclosure relates to an apparatus and method for analyzing an influence variable on membrane fouling of a seawater desalination system, in which influence variables other than variables having a low degree of influence, among variables affecting the membrane, are selected, and the influence thereof on membrane fouling is used to derive an equation. The influence variable, the value of which may be increased or decreased, and the extent of such increase or decrease may be accurately calculated.

Figure 2:
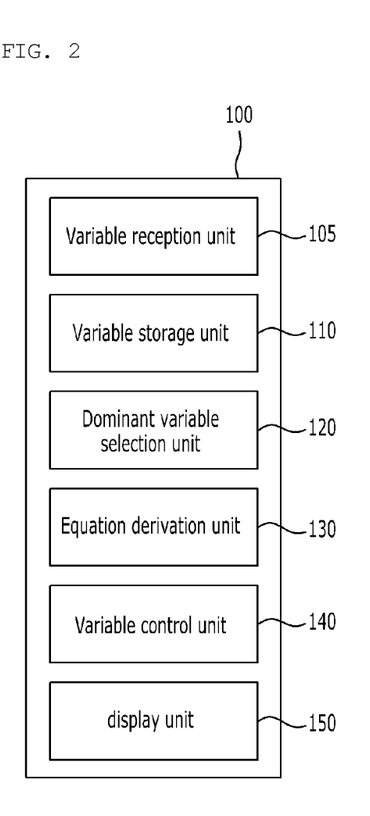
FIG. 2 is a block diagram showing a configuration of an apparatus for analyzing membrane fouling of a seawater desalination system according to an embodiment of the present disclosure.

FIG. 2 shows a configuration of an apparatus for analyzing membrane fouling of a seawater desalination system according to an embodiment of the present disclosure.

In an aspect of the disclosure, the apparatus 100 for analyzing the membrane fouling of a seawater desalination system includes a variable reception unit 105 configured to receive variables affecting membrane fouling of a seawater desalination system collected by a sensor included in the seawater desalination system; a variable storage unit 110 configured to store variables affecting the membrane fouling of a seawater desalination system, a dominant variable selection unit 120 configured to select at least one dominant variable among the variables through at least one algorithm, an equation derivation unit 130 configured to derive a specific equation based on a correlation between the selected dominant variable and the membrane fouling and a variable control unit 140 configured to control the seawater desalination system to control the dominant variable.

Figure 1:
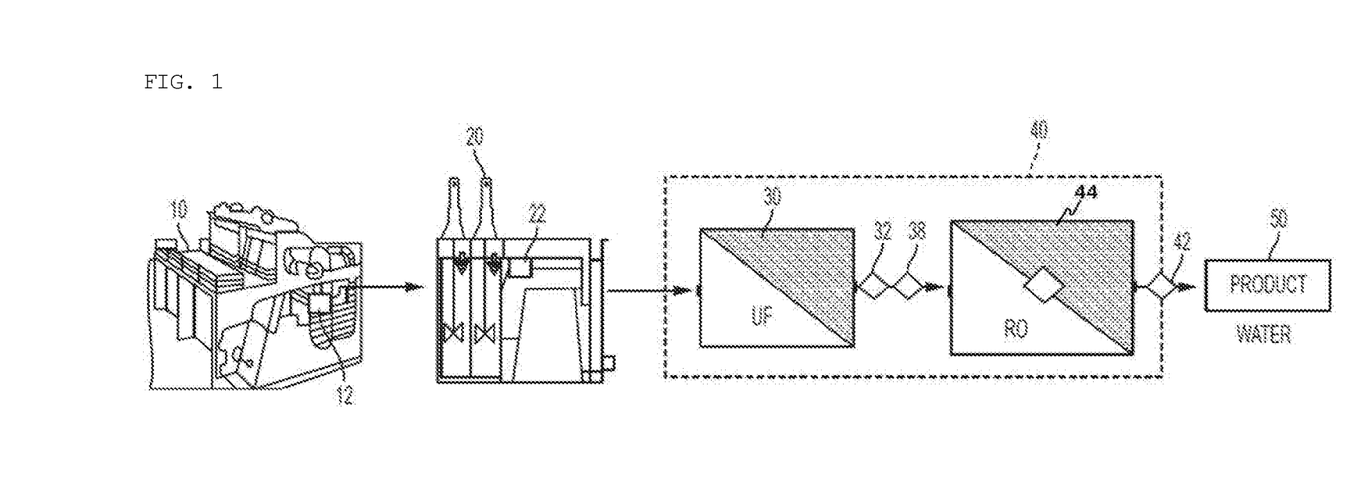
FIG. 1 illustrates a seawater desalination system according to an embodiment of the present disclosure.

The variable reception unit 105 receives a variable that affects membrane fouling of the seawater desalination system collected from the seawater desalination system shown in FIG. 1.

The seawater desalination system includes a sensor, which collects variables that affect the membrane fouling of the seawater desalination system.

The seawater desalination system communicates wired and/or wireless with the apparatus for analyzing membrane fouling of the seawater desalination apparatus.

The seawater desalination system transmits the variables affecting the membrane contamination of the seawater desalination device to the apparatus for analyzing membrane fouling of a seawater desalination system.

In an embodiment of the disclosure, the variable storage unit 110 is configured to store variables affecting the membrane fouling of the seawater desalination system. In the membrane fouling, the membrane is at least one of an RO (Reverse Osmosis) membrane and a UF (Ultra Filtration) membrane. The membrane fouling includes at least one of a water permeability change of the membrane and a differential pressure change of the membrane.

In an embodiment of the disclosure, the dominant variable selection unit 120 is configured to select at least one dominant variable, among the variables, through at least one algorithm. A detailed description of the algorithms will be given later.

In an embodiment of the disclosure, the equation derivation unit 130 is configured such that the correlation between the selected dominant variable and the membrane fouling is used to derive a specific equation. The equation derivation unit 130 is able to derive the specific equation based on the correlation between the dominant variable and the membrane fouling through at least one algorithm selected from among SPI (Single-Predictor Identification), PME (Progressive Model Enhancement), BMA (Bayesian Model Averaging) and GA (Genetic Algorithm).

In an embodiment of the disclosure, the variables affecting the membrane fouling may include at least one selected from among a variable measured during an intake process, a variable measured after a UF (Ultra Filtration) process, a variable measured during a DAF (Dissolved Air Flotation) process, a variable measured before an RO (Reverse Osmosis) process, and a variable measured after an RO (Reverse Osmosis) process. The variables affecting the membrane fouling are not limited thereto, and may include a variable describing the interaction of variables affecting the membrane fouling. Also, a variable of a transformed value in the form of an algebraic square of the variable affecting the membrane fouling may be included.

The variable control unit 140 controls the seawater desalination system to adjust the dominant variable.

The variable control unit 140 controls the seawater desalination system to reduce or increase the amount of the dominant variable.

The variable control unit 140 transmits a variable adjustment command to the seawater desalination system to reduce or increase the amount of the influential variable.

Upon receipt of the variable adjustment command, the seawater desalination system increases or decreases the variable corresponding to the variable adjustment command according to the variable control command.

FIG. 1 illustrates an embodiment of the seawater desalination system as described in the disclosure. The seawater desalination system includes an intake facility 10 that performs an intake process. The intake process is a process of bringing seawater to a seawater desalination plant, and functions to remove suspended materials from the seawater.

The seawater from which suspended materials are removed is transferred to a DAF facility 20 that is responsible for performing a DAF (Dissolved Air Flotation) process using a pump. The DAF process functions such that a colloidal material is separated from the seawater through a bubbling effect using a chemical, and the colloidal material is then transferred to a subsequent processing unit. The colloidal material may be composed of particles having a size of 0.001 to 0.1 μm. The colloidal material refers to various impurities contained in the seawater, and examples thereof may include microorganisms, ammonia, oil, etc. Examples of the chemical used for separating the colloidal material include iron chloride ($FeCl_3$), sodium hypochlorite and sulfuric acid ($H_2SO_4$). Here, iron chloride is a coagulant for coagulating particles of the colloidal material to form large lumps, and sulfuric acid plays a role in maintaining the seawater at a pH of 6.4 to 7 in order to strengthen the coagulation effect.

The seawater subjected to the DAF (Dissolved Air Flotation) process is transferred to a device 40 that includes the UF (Ultra Filtration) device 30. The UF process is a desalination pretreatment process for re-treating the seawater subjected to the DAF process so as to remove suspended materials.

The seawater subjected to the UF (Ultra Filtration) process is transferred to an RO device 44 that performs the RO (Reverse Osmosis) process. The RO process functions to convert the seawater having no fouling sources into fresh water 50 through RO.

The environmental information, the chemical information, and the water-quality information of water present in a specific area are measured or calculated by a sensor and a computing device provided to the seawater desalination plant. The apparatus for analyzing the membrane fouling of the seawater desalination system receives the measured or calculated environmental information, chemical information, and water-quality information.

The variable measured by a sensor 12 during the intake process may include at least one selected from among variables measured in seawater during the intake process, such as seawater pH, conductivity, temperature, turbidity, an amount of chlorophyll-a, total organic carbon (TOC), and total suspended solids (TSS).

The variable measured by a sensor 32 after the UF (Ultra Filtration) process may include at least one selected from among variables measured in seawater immediately after the UF process, such as a membrane fouling index (SDI: Silt Density Index), conductivity, temperature, turbidity, an amount of chlorophyll-a, and total organic carbon (TOC).

The variable measured by a sensor 22 during the DAF (Dissolved Air Flotation) process may include at least one selected from among variables measured in seawater during the DAF process, such as the amount of iron chloride and the amount of sulfuric acid.

The variable measured by a sensor 38 before the RO (Reverse Osmosis) process may include at least one selected from among variables measured in seawater immediately before the RO process, such as total dissolved solids (TDS), conductivity, temperature, and feed pressure.

The variable measured by a sensor 42 after the RO (Reverse Osmosis) process may include at least one selected from among variables measured in seawater immediately after the RO process, such as total dissolved solids (TDS), conductivity, and salt rejection.

The membrane may be contaminated with respect to at least one of the variables in the intake process, the variable after the UF (Ultra Filtration) process, the variable in the DAF (Dissolved Air Floatation) process, the variable before the RO (Reverse Osmosis) process, and the variable after the RO (Reverse Osmosis).

Membrane fouling is a phenomenon in which various foreign substances present in the influent water are deposited or adsorbed on the surface of the reverse osmosis membrane, resulting in clogging of the membrane. As a result, the water permeability of the membrane decreases.

Causes of membrane contamination include suspended particles, colloids, organic matters, inorganic salts such as microorganisms and calcium salts, sediment, scale, and oxidation.

The variable in the intake process, the variable after the UF (Ultra Filtration) process, the variable in the DAF (Dissolved Air Floatation) process, the variable before the RO (Reverse Osmosis) process, and the variable after the RO (Reverse Osmosis) may be the causes of membrane contamination.

The variable in the intake process, the variable after the UF (Ultra Filtration) process, the variable in the DAF (Dissolved Air Floatation) process, the variable before the RO (Reverse Osmosis) process, and the variable after the RO (Reverse Osmosis) may be variables related to the occurrence of causes of membrane contamination.

The influencing variables selected by the apparatus 100 for analyzing the membrane fouling of a seawater desalination system can be output to the display unit 150 included in the apparatus 100 for analyzing the membrane fouling of a seawater desalination system.

Further, the selected influence variables may be transmitted to the terminal device of the administrator through the communication unit included in the apparatus 100 for analyzing the membrane fouling of a seawater desalination system. The terminal of the administrator can receive the selected influencing variables to identify what variables affect the membrane contamination.

The intake facility 10 can control the amount of PH, conductivity, temperature, turbidity, chlorophyll-a of the seawater variable in the intake process, organic carbon content (TOC), and suspended solids(TSS).

The method for controlling an amount of PH, conductivity, temperature, turbidity, chlorophyll-a, total organic carbon (TOC) and suspended substance(TSS) may be a method combining one or more known methods.

The DAF facility 20 can control the amount of iron chloride and the amount of sulfuric acid in the DAF (Dissolved Air Floatation) process.

The method for controlling an amount of iron chloride and sulfuric acid may be a method combining one or more known methods.

The UF (Ultra Filtration) device 30 can control the amount of film contamination index(SDI), a conductivity, a temperature, a turbidity, a quantity of chlorophyll-a and total organic carbon(TOC).

The method for controlling an amount of film contamination index(SDI), a conductivity, a temperature, a turbidity, a quantity of chlorophyll-a and total organic carbon(TOC) may be a method combining one or more known methods.

The UF(Ultra Filtration) device 30 or the RO device 44 can control the amount of total dissolved solids(TDS) and the conductivity, temperature, and feed pressure.

The method for controlling amount of total dissolved solids(TDS) and the conductivity, temperature, and feed pressure may be a method combining one or more known methods.

The RO device 44 can control the amount of total dissolved solids(TDS), conductivity, and salt rejection.

The method for controlling amount of total dissolved solids(TDS), conductivity, and salt rejection may be a method combining one or more known methods.

In an embodiment of the disclosure, the algorithm includes at least one selected from among SPI (Single-Predictor Identification), PME (Progressive Model Enhancement), BMA (Bayesian Model Averaging), and GA (Genetic Algorithm).

The feature matrix X for the variables affecting the membrane fouling is described below.

$$X = \begin{bmatrix} x_{11} & \cdots & x_{1p} & x_{1(p+1)} & \cdots & x_{1(p+q)} \\ \vdots & \ddots & \vdots & \vdots & \ddots & \vdots \\ x_{N1} & \cdots & x_{Np} & x_{N(p+1)} & \cdots & x_{N(p+q)} \end{bmatrix} = (x_1, \ldots, x_p, \ldots, x_{p+q})$$

Here, $x_j$ is defined as follows.

$$x_j = (x_{1j}, x_{2j}, \ldots, x_{Nj})^T, j=1, \ldots, p+q \text{ column vector}$$

N is the number of variables. During the seawater desalination, increasing the differential pressure value of the membrane from an arbitrary starting point and then increasing the differential pressure value of the membrane from another arbitrary starting point are repeated. Here, the period in which the differential pressure value of the membrane increases from an arbitrary starting point until just before it decreases to another arbitrary value may be defined as one cycle, where N is the number of cycles.

Also, p is the variable affecting the membrane fouling, and specific examples thereof are as described above, and q includes a variable corresponding to the interaction of variables affecting the membrane fouling and a variable corresponding to the transformed value in the form of an algebraic square of the variable affecting the membrane fouling. Also, y is a membrane-fouling vector (response vector), which is any one of a water permeability gradient of the membrane and a differential pressure gradient of the membrane.

In an embodiment of the disclosure, storing variables depending on an SPI (Single-Predictor Identification) algorithm is performed as follows.

The dominant variable selection unit 120 is configured to derive the following simple regression model, which describes each dependent variable y for a single feature variable $x_j$ belonging to the feature matrix X through the SPI algorithm.

$$y = \beta_0 + \beta_1 x_j + \varepsilon \text{ where } \varepsilon \sim N(0, \sigma^2)$$

With regard to the simple regression model, an F-test for $\beta_1 = 0$ is performed in order to determine the significance of the feature variable, and when the p-value is lower than a preset significance level α, the corresponding variable is selected as an influence variable candidate. The significance level is a value less than 1 but exceeding 0.

The above procedure is performed for all feature variables $x_j$, j=1, . . . , p+q, whereby a set of influence variable candidates $S_{SPI}$ may be obtained.

In an embodiment of the disclosure, storing variables depending on a PME (Progressive Model Enhancement) algorithm is performed as follows.

The dominant variable selection unit 120 is configured to derive the following multiple linear regression model including the feature matrix X as an independent variable and the membrane fouling response vector y as a dependent variable through the PME algorithm.

$$y = \beta_0 + \Sigma_{i=1}^{m} \beta_i x_i + \varepsilon, \text{ where } x_i \in M_k, n(M_k) = m, m \leq p+q$$

Here, n(•) is the number of elements contained in the set, and $M_k$ is any subset of the feature variables $(x_1, \ldots, x_{(p+q)})$.

The process of sequentially including or excluding the variables affecting the membrane fouling in or from the model is repeated until an additional improvement in the model is not obtained, and the feature variable $x_j$ contained in $M_k$ is selected. The improvement in the model is determined based on a change in the likelihood of the above multiple linear regression model.

To select the variable, the likelihood-based AIC (Akaike Information Criterion), which applies a penalty to the number of variables contained in the model, may be used.

In an embodiment of the disclosure, storing variables depending on a BMA (Bayesian Model Averaging) algorithm is performed as follows.

The dominant variable selection unit 120 is configured to derive the following multiple linear regression model including the feature matrix X as an independent variable and the membrane fouling response vector y as a dependent variable through the BMA algorithm.

$$y = \beta_0 + \Sigma_{i=1}^{m} \beta_i x_i + \varepsilon, \text{ where } x_i \in M_k, n(M_k) = m, m \leq p+q$$

Here, $M_k$ is any subset of the feature variables $(x_1, \ldots, x_{(p+q)})$. When a set of numbers in all possible cases of $M_k$ is $M = \{M_1, \ldots, M_K\}$, the posterior probability of the model produced by any $M_k$ is as follows.

$$Pr(M_k | X) = \frac{Pr(X | M_k) Pr(M_k)}{\sum_{r=1}^{K} Pr(X | M_r) Pr(M_r)} \text{ where}$$

$$Pr(X | M_r) = \int Pr(X | \beta_r, M_k) Pr(\beta_r | M_r) d\beta_r$$

Here, $\beta_r$ is the regression coefficient vector corresponding to the feature variable subset $M_r$. The posterior distribution for the regression coefficient $\beta_j$ of the feature variables $x_j$, j=1, . . . , p+q is as follows.

$$Pr(\beta_j | X) = \sum_{k=1}^{K} Pr(\beta_j | M_k, X) Pr(M_k | X)$$

The significance of individual feature variables may be evaluated based on the above equation. By the dominant variable selection unit 120, when the probability that the $\beta_j$ credible interval does not include 0 is less than the preset significance level α, the corresponding variable is selected as an influence variable candidate. The significance level is a value less than 1 but exceeding 0.

The above procedure is performed for all feature variables $x_j$, j=1, . . . , p+q, whereby a set of influence variable candidates $S_{BMA}$ may be obtained.

In an embodiment of the disclosure, storing variables depending on a GA (Genetic Algorithm) algorithm is performed as follows.

The dominant variable selection unit 120 is configured to derive the following multiple linear regression model including the feature matrix X as an independent variable and the membrane fouling response vector y as a dependent variable through the GA (Genetic Algorithm) algorithm.

$$y = \beta_0 + \Sigma_{l=1}^{m} \beta_l x_l + \varepsilon, \text{ where } x_l \in M_k, n(M_k) = m, m \leq p+q$$

Here, $M_k$ is any subset of the feature variables $(x_1, \ldots, x_{(p+q)})$.

The MSE (Mean Squared Error) of the multiple linear regression model residual is input to a fitness function $f(\bullet)$, and a genetic operation process including selection, crossover and mutation is repeated in an initial population $M^P = \{M_1, \ldots, M_g\}$. Here, g is the number of populations.

By the dominant variable selection unit 120, the above procedure is repeated until the predetermined termination standard is satisfied, whereby the variable belonging to $\{M_{best} | M_k \subset M^P, f(M_{best}) > f(M_k)\}$ having the highest fitness in the final population $M^P$ is determined as a set of influence variable candidates $S_{GA} = M_k$.

In an embodiment of the disclosure, the dominant variable selection unit 120 is configured such that a variable chosen in common by at least two algorithms among SPI (Single-Predictor Identification), PME (Progressive Model Enhancement), BMA (Bayesian Model Averaging) and GA (Genetic Algorithm) is selected as a dominant variable.

The dominant variable selection unit 120 is configured such that, in the set of influence variable candidates $S = (S_{SPI}, S_{PME}, S_{BMA}, S_{GA})$ selected through four algorithms, the set of feature variables included at least H times is represented as $S_{min}$ and the set of feature variables included at least one time is represented as $S_{max}$, where H may be 2. The variable chosen in common by at least two algorithms is determined to be a variable having high reliability, and may thus be selected as the dominant variable.

In an embodiment of the disclosure, the equation derivation unit 130 is configured such that the correlation between the selected dominant variable and the membrane fouling is used to derive a specific equation through a PME algorithm. A detailed description of the PME algorithm is as above. The equation derivation unit 130 is able to derive the following equation based on the correlation between the dominant variable and the membrane fouling.

$$y = \beta_0 + \Sigma_{l=1}^{m} \beta_l x_l + \varepsilon, \text{ where } x_l \in M_k, n(M_k) = m, m \leq p+q$$

Figure 3:
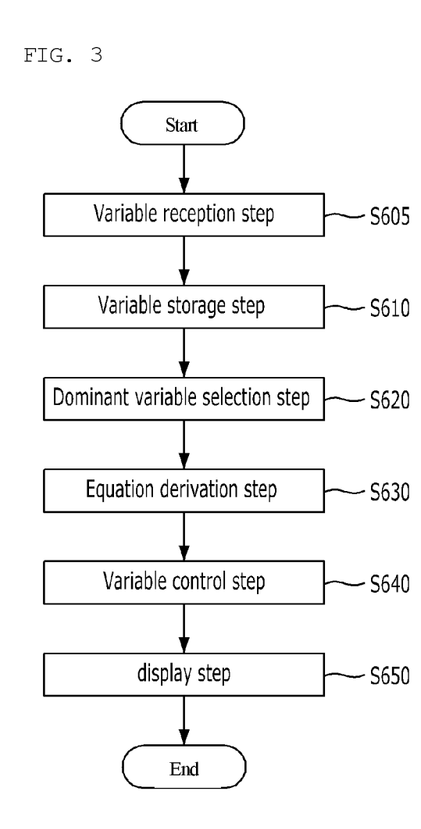
FIG. 3 is a flowchart showing a process of analyzing membrane fouling of a seawater desalination system according to an embodiment of the present disclosure.

FIG. 3 is a flowchart showing the process of analyzing the membrane fouling of the seawater desalination system according to an embodiment of the disclosure.

In an aspect of the disclosure, the method of analyzing the membrane fouling of the seawater desalination system includes a variable reception step (S605) of receiving variables affecting membrane fouling of a seawater desalination system collected by a sensor included in the seawater desalination system; a variable storage step (S610) of storing variables affecting the membrane fouling of a seawater desalination system, a dominant variable selection step (S620) of selecting at least one dominant variable among the variables through at least one algorithm, an equation derivation step (S630) of deriving a specific equation using a correlation between the selected dominant variable and the membrane fouling; and a variable control step (S640) of controlling the seawater desalination system to control dominant variable.

The variable reception step (S605) receives a variable that affects membrane fouling of the seawater desalination system collected from the seawater desalination system shown in FIG. 1.

The seawater desalination system includes a sensor, which collects variables that affect the membrane fouling of the seawater desalination system.

The seawater desalination system communicates wired and/or wireless with the apparatus for analyzing membrane fouling of the seawater desalination apparatus according to the present disclosure.

The seawater desalination system transmits the variables affecting the membrane contamination of the seawater desalination device to the apparatus for analyzing membrane fouling of a seawater desalination system.

In an embodiment of the disclosure, the variable storage step (S610) includes storing variables affecting the membrane fouling of a seawater desalination system. In the membrane fouling, the membrane is at least one of an RO (Reverse Osmosis) membrane and a UF (Ultra Filtration) membrane. The membrane fouling includes at least one of a water permeability change of the membrane and a differential pressure change of the membrane.

In an embodiment of the disclosure, the dominant variable selection step (S620) includes selecting at least one dominant variable among the variables through at least one algorithm. A detailed description of the algorithms is given later.

In an embodiment of the disclosure, the equation derivation step (S630) includes deriving the specific equation using the correlation between the selected dominant variable and the membrane fouling. The equation derivation step (S630) is able to derive the specific equation based on the correlation between the dominant variable and the membrane fouling through at least one algorithm selected from among SPI (Single-Predictor Identification), PME (Progressive Model Enhancement), BMA (Bayesian Model Averaging) and GA (Genetic Algorithm).

In an embodiment of the disclosure, the variables affecting the membrane fouling may include at least one selected from among a variable measured during an intake process, a variable measured after a UF (Ultra Filtration) process, a variable measured during a DAF (Dissolved Air Flotation) process, a variable measured before an RO (Reverse Osmosis) process, and a variable measured after an RO (Reverse Osmosis) process. The variables affecting the membrane fouling are not limited thereto, and may include a variable describing the interaction of variables affecting the membrane fouling. Also, a variable of a transformed value in the form of an algebraic square of the variable affecting the membrane fouling may be included.

The variable control step (S640) controls the seawater desalination system to adjust the dominant variable.

The variable control step (S640) controls the seawater desalination system to reduce or increase the amount of the dominant variable.

The variable control step (S640) transmits a variable adjustment command to the seawater desalination system to reduce or increase the amount of the influential variable.

Upon receipt of the variable adjustment command, the seawater desalination system increases or decreases the variable corresponding to the variable adjustment command according to the variable control command.

The seawater desalination system includes the intake facility 10 that performs an intake process. The intake process is a process of bringing seawater to a seawater desalination plant, and functions to remove suspended materials from the seawater. The seawater from which suspended materials are removed is transferred to the DAF facility 20 that is responsible for DAF (Dissolved Air Flotation) using a pump.

The DAF process functions such that a colloidal material is separated from the seawater through a bubbling effect using a chemical and is then transferred to the subsequent processing unit. The colloidal material is composed of particles having a size of 0.001 to 0.1 µm. The colloidal material refers to various impurities contained in the seawater, and examples thereof may include microorganisms, ammonia, oil, etc.

Examples of the chemical for separating the colloidal material include iron chloride ($FeCl_3$), sodium hypochlorite and sulfuric acid ($H_2SO_4$). Here, iron chloride is a coagulant for coagulating particles of the colloidal material to form large lumps, and sulfuric acid plays a role in maintaining the seawater at a pH of 6.4 to 7 in order to strengthen the coagulation effect.

The seawater subjected to the DAF process is transferred to the device 30 that performs the UF (Ultra Filtration) process. The UF process is a desalination pretreatment process for re-treating the seawater subjected to the DAF process so as to remove suspended materials.

The seawater subjected to the UF process is transferred to the device 44 that performs the RO (Reverse Osmosis) process. The RO process functions to convert seawater having no fouling sources into fresh water 50 through RO.

The environmental information, the chemical information, and the water-quality information of water present in a specific area are measured or calculated by means of a sensor and a computing device provided to the seawater desalination plant. The apparatus for analyzing the membrane fouling of the seawater desalination system receives the measured or calculated environmental information, chemical information, and water-quality information.

The variable measured by sensor 12 during the intake process may include at least one selected from among variables measured in seawater during the intake process, such as seawater pH, conductivity, temperature, turbidity, an amount of chlorophyll-a, total organic carbon (TOC), and total suspended solids (TSS).

The variable measured by sensor 32 after the UF process may include at least one selected from among variables measured in seawater immediately after the UF process, such as membrane fouling index (SDI: Silt Density Index), conductivity, temperature, turbidity, an amount of chlorophyll-a, and total organic carbon (TOC).

The variable measured by sensor 22 during the DAF process may include at least one selected from among variables measured in seawater during the DAF process, such as the amount of iron chloride and the amount of sulfuric acid.

The variable measured by sensor 38 before the RO process may include at least one selected from among variables measured in seawater immediately before the RO process, such as total dissolved solids (TDS), conductivity, temperature, and feed pressure.

The variable measured by sensor 42 after the RO process may include at least one selected from among variables measured in seawater immediately after the RO process, such as total dissolved solids (TDS), conductivity, and salt rejection.

The membrane may be contaminated with respect to at least one of the variables in the intake process, the variable after the UF (Ultra Filtration) process, the variable in the DAF (Dissolved Air Floatation) process, the variable before the RO (Reverse Osmosis) process, and the variable after the RO (Reverse Osmosis).

Membrane fouling is a phenomenon that various foreign substances present in the influent water are deposited or adsorbed on the surface of the reverse osmosis membrane, resulting in clogging of the membrane. As a result, the water permeability of the membrane decreases.

Causes of membrane contamination include suspended particles, colloids, organic matters, inorganic salts such as microorganisms and calcium salts, sediment, scale, and oxidation.

The variable in the intake process, the variable after the UF (Ultra Filtration) process, the variable in the DAF (Dissolved Air Floatation) process, the variable before the RO (Reverse Osmosis) process, and the variable after the RO (Reverse Osmosis) may be just the causes of membrane contamination.

The variable in the intake process, the variable after the UF (Ultra Filtration) process, the variable in the DAF (Dissolved Air Floatation) process, the variable before the RO (Reverse Osmosis) process, and the variable after the RO (Reverse Osmosis) may be variables related to the occurrence of causes of membrane contamination.

The influencing variables selected by the apparatus 100 for analyzing the membrane fouling of a seawater desalination system can be output to the display unit included in the apparatus 100 for analyzing the membrane fouling of a seawater desalination system.

The method of analyzing membrane fouling of a seawater desalination system further comprises a display step. The display step (s650) outputs the influencing variables.

Further, the selected influence variables may be transmitted to the terminal device of the administrator through the communication unit included in the apparatus 100 for analyzing the membrane fouling of a seawater desalination system. The terminal of the administrator can receive the selected influencing variables to identify what variables affect the membrane contamination.

The intake facility 10 can control the amount of PH, conductivity, temperature, turbidity, chlorophyll-a of the seawater variable in the intake process, organic carbon content (TOC), and suspended solids(TSS).

The method for controlling amount of PH, conductivity, temperature, turbidity, chlorophyll-a, total organic carbon (TOC) and suspended substance(TSS) may be a method combining one or more known methods.

The DAF facility 20 can control the amount of iron chloride and the amount of sulfuric acid in the DAF (Dissolved Air Floatation) process.

The method for controlling an amount of iron chloride and sulfuric acid may be a method combining one or more known methods.

The UF (Ultra Filtration) device 30 can control the amount of film contamination index(SDI), a conductivity, a temperature, a turbidity, a quantity of chlorophyll-a and total organic carbon(TOC).

The method for controlling an amount of film contamination index(SDI), a conductivity, a temperature, a turbidity, a quantity of chlorophyll-a and total organic carbon(TOC) may be a method combining one or more known methods.

The UF(Ultra Filtration) device 30 or the RO device 44 can control the amount of total dissolved solids(TDS) and the conductivity, temperature, and feed pressure.

The method for controlling an amount of total dissolved solids(TDS) and the conductivity, temperature, and feed pressure may be a method combining one or more known methods.

The RO device 44 can control the amount of total dissolved solids(TDS), conductivity, and salt rejection.

The method for controlling an amount of total dissolved solids(TDS), conductivity, and salt rejection may be a method combining one or more known methods.

In an embodiment of the disclosure, the algorithm includes at least one selected from among SPI (Single-Predictor Identification), PME (Progressive Model Enhancement), BMA (Bayesian Model Averaging), and GA (Genetic Algorithm).

The feature matrix X for the variables affecting the membrane fouling is described below.

$$X = \begin{bmatrix} x_{11} & \cdots & x_{1p} & x_{1(p+1)} & \cdots & x_{1(p+q)} \\ \vdots & \ddots & \vdots & \vdots & \ddots & \vdots \\ x_{N1} & \cdots & x_{Np} & x_{N(p+1)} & \cdots & x_{N(p+q)} \end{bmatrix} = (x_1, \ldots, x_p, \ldots, x_{p+q})$$

Here, $x_j$ is defined as follows.

$$x_j = (x_{1j}, x_{2j}, \ldots, x_{Nj})^T, j=1, \ldots, p+q \text{ column vector}$$

N is the number of variables. During the seawater desalination, increasing the differential pressure value of the membrane from an arbitrary starting point and then increasing the differential pressure value of the membrane from another arbitrary starting point are repeated. Here, the period in which the differential pressure value of the membrane increases from an arbitrary starting point until just before it decreases to another arbitrary value may be defined as one cycle, where N is the number of cycles.

Also, p is the variable affecting the membrane fouling, and specific examples thereof are as described above, and q includes a variable corresponding to the interaction of variables affecting the membrane fouling and a variable corresponding to the transformed value in the form of an algebraic square of the variable affecting the membrane fouling. Also, y is a membrane-fouling vector (response vector), which is any one of a water permeability gradient of the membrane and a differential pressure gradient of the membrane.

In an embodiment of the disclosure, storing variables depending on an SPI (Single-Predictor Identification) algorithm is performed as follows.

The dominant variable selection step (S620) derives the following simple regression model, which describes each dependent variable y for a single feature variable $x_j$ belonging to the feature matrix X through the SPI algorithm.

$$y = \beta_0 + \beta_1 x_j + \varepsilon \text{ where } \varepsilon \sim N(0, \sigma^2)$$

With regard to the simple regression model, an F-test for $\beta_1 = 0$ is performed in order to determine the significance of the feature variable, and when the p-value is lower than the preset significance level α, the corresponding variable is selected as an influence variable candidate. The significance level is a value less than 1 but exceeding 0.

The above procedure is performed for all feature variables $x_j$, j=1, ..., p+q, whereby a set of influence variable candidates $S_{SPI}$ may be obtained.

In an embodiment of the disclosure, storing variables depending on a PME (Progressive Model Enhancement) algorithm is performed as follows.

The dominant variable selection step (S620) derives the following multiple linear regression model including the feature matrix X as an independent variable and the membrane fouling response vector y as a dependent variable through the PME algorithm.

$$y = \beta_0 + \Sigma_{l=1}^{m} \beta_l x_l + \varepsilon, \text{ where } x_l \in M_k, n(M_k) = m, m \leq p+q$$

Here, n(•) is the number of elements contained in the set, and $M_k$ is any subset of the feature variables $(x_1, \ldots, x_{(p+q)})$.

The process of sequentially including or excluding the variables affecting the membrane fouling in or from the model is repeated until an additional improvement in the model is not obtained, and the feature variable $x_j$ contained in $M_k$ is selected.

The improvement in the model is determined based on a change in the likelihood of the above multiple linear regression model. To select the variable, the likelihood-based AIC (Akaike Information Criterion), which applies a penalty to the number of variables contained in the model, may be used.

In an embodiment of the disclosure, storing variables depending on a BMA (Bayesian Model Averaging) algorithm is performed as follows.

The dominant variable selection step (S620) derives the following multiple linear regression model including the feature matrix X as an independent variable and the membrane fouling response vector y as a dependent variable through the BMA algorithm.

$$y = \beta_0 + \Sigma_{l=1}^{m} \beta_l x_l + \varepsilon, \text{ where } x_l \in M_k, n(M_k) = m, m \leq p+q$$

Here, $M_k$ is any subset of the feature variables $(x_1, \ldots, x_{(p+q)})$. When a set of numbers in all possible cases of $M_k$ is $M = \{M_1, \ldots, M_K\}$, the posterior probability of the model produced by any $M_k$ is as follows.

$$Pr(M_k | X) = \frac{Pr(X | M_k) Pr(M_k)}{\sum_{r=1}^{K} Pr(X | M_r) Pr(M_r)} \text{ where}$$

$$Pr(X | M_r) = \int Pr(X | \beta_r, M_k) Pr(\beta_r | M_r) d\beta_r$$

Here, $\beta_r$ is the regression coefficient vector corresponding to the feature variable subset $M_r$. The posterior distribution for the regression coefficient $\beta_j$ of the feature variables $x_j$, j=1, ..., p+q is as follows.

$$Pr(\beta_j | X) = \sum_{k=1}^{K} Pr(\beta_j | M_k, X) Pr(M_k | X)$$

The significance of individual feature variables may be evaluated based on the above equation. In the dominant variable selection step (S620), when the probability that the $\beta_j$ credible interval does not include 0 is less than the preset significance level α, the corresponding variable is selected as an influence variable candidate. The significance level is a value less than 1 but exceeding 0.

The above procedure is performed for all feature variables $x_j$, j=1, ..., p+q, whereby a set of influence variable candidates $S_{BMA}$ may be obtained.

In an embodiment of the disclosure, storing variables depending on a GA (Genetic Algorithm) algorithm is performed as follows.

The dominant variable selection step (S620) derives the following multiple linear regression model including the feature matrix X as an independent variable and the membrane fouling response vector y as a dependent variable through the GA algorithm.

$$y = \beta_0 + \sum_{l=1}^{m} \beta_l x_l + \varepsilon, \text{ where } x_l \in M_k, n(M_k) = m, m \leq p+q$$

Here, $M_k$ is any subset of the feature variables $(x_1, \ldots, x_{(p+q)})$.

The MSE (Mean Squared Error) of the multiple linear regression model residual is input to the fitness function $f(\bullet)$, and a genetic operation process including selection, crossover and mutation is repeated in an initial population $M^p = \{M_1, \ldots, M_g\}$. Here, g is the number of populations.

In the dominant variable selection step (S620), the above procedure is repeated until the predetermined termination standard is satisfied, whereby the variable belonging to $\{M_{best} | M_k \subset M^p, f(M_{best}) > f(M_k)\}$ having the highest fitness in the final population $M^p$ is determined as a set of influence variable candidates $S_{GA} = M_k$.

In an embodiment of the disclosure, the dominant variable selection step (S620) is performed in a manner in which a variable chosen in common by at least two algorithms among SPI (Single-Predictor Identification), PME (Progressive Model Enhancement), BMA (Bayesian Model Averaging) and GA (Genetic Algorithm) is selected as a dominant variable.

In the dominant variable selection step (S620), in the set of influence variable candidates $S = (S_{SPI}, S_{PME}, S_{BMA}, S_{GA})$ selected through four algorithms, a set of feature variables included at least H times is represented as $S_{min}$ and a set of feature variables included at least one time is represented as $S_{max}$, where H may be 2. The variable chosen in common by at least two algorithms is assumed to be a variable having high reliability, and may thus be selected as the dominant variable.

In an embodiment of the disclosure, the equation derivation step (S630) is performed in a manner in which the correlation between the selected dominant variable and the membrane fouling is used to derive a specific equation through the PME algorithm. A detailed description of the PME algorithm is as above. The equation derivation step (S630) is able to derive the following equation based on the correlation between the dominant variable and the membrane fouling.

$$y = \beta_0 + \sum_{l=1}^{m} \beta_l x_l + \varepsilon, \text{ where } x_l \in M_k, n(M_k) = m, m \leq p+q$$

Figure 4:
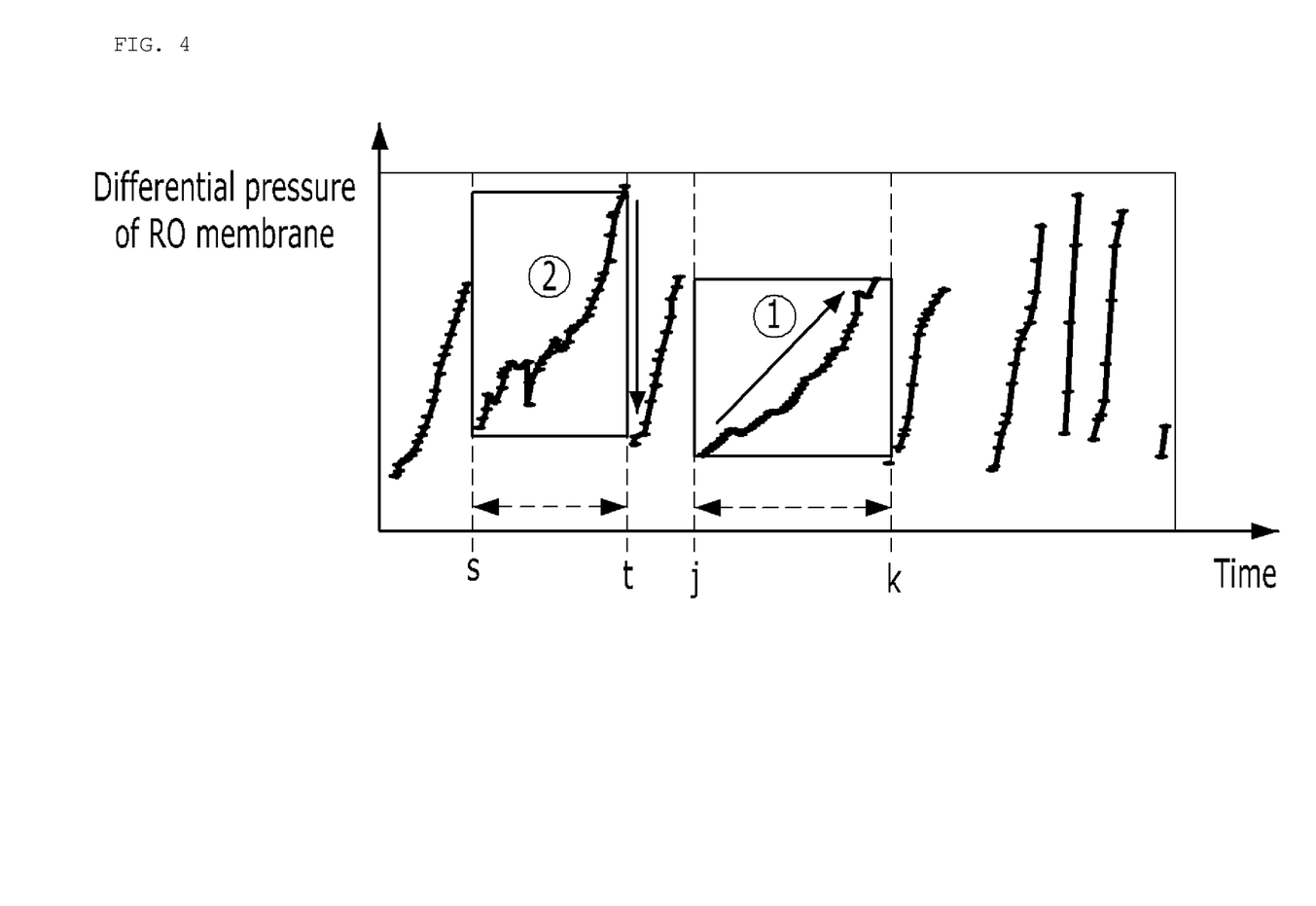
FIG. 4 is a graph showing changes in differential pressure of an RO (Reverse Osmosis) membrane.

FIG. 4 is a graph showing changes in the differential pressure of the RO (Reverse Osmosis) membrane.

The longitudinal axis is the differential pressure value of the RO (Reverse Osmosis) membrane and the transverse axis is the time. As shown in FIG. 4, during the seawater desalination, increasing the differential pressure value of the membrane from an arbitrary starting point and then increasing the differential pressure value of the membrane from another arbitrary starting point may be repeated. Here, the period in which the differential pressure of the RO membrane increases until just before it decreases may be set to one cycle. For example, the s-to-t zone is one cycle, and the j-to-k zone is one cycle. As shown in the graph, "1" illustrates the zone in which the differential pressure is increased, and "2" indicates the zone in which the differential pressure is maximally increased and then decreased to some arbitrary value.

As described hereinbefore, those skilled in the art will recognize that the present disclosure may be embodied in other specific forms without departing from the technical spirit or essential features thereof. It is therefore to be understood that the aforementioned embodiments are merely illustrative and not restrictive of the scope of the disclosure. It is also to be understood that the flowcharts shown in the drawings are sequential steps that are set forth merely in order to achieve the most desirable results in practicing the present disclosure, and that other additional steps may be provided, some steps may be omitted, or the steps may be performed in other orders.

The technical features and embodiments described herein may be implemented in digital electronic circuitry, or may be implemented in computer software, firmware, or hardware, including structures and structural equivalents thereof, as described herein, or combinations thereof. Also, embodiments for realizing the technical features described herein may be implemented as computer program products, that is, modules relating to computer program instructions encoded on a program storage medium of a type for execution by, or for controlling the operation of, a processing system.

Meanwhile, computer-readable media suitable for storing computer program instructions and data include, for example, semiconductor memory devices such as EPROM, EEPROM and flash memory devices, for example, all types of non-volatile memory, media and memory devices, including magnetic disks such as internal hard disks or external disks, magneto-optical disks and CDs and DVD disks. The processor and memory may be supplemented by, or integrated with, logic circuits for use for special purposes.

Embodiments that implement the technical features described herein may be executed in an operating system, including, for example, back-end components such as a data server, middleware components such as an application server, front-end components such as a web browser or a client computer with a graphical user interface that allows a user to interact with an embodiment of the subject matter described herein, or combinations of such back-end, middleware or front-end components. The components of the system may also be interconnected by any form or medium of digital data communication, for example, a communication network.

Hereinafter, more specific embodiments capable of implementing the configurations including the system described in this specification and the method for providing MO service-based benefit will be described in detail.

Also, the system and method described herein may be implemented in hardware or a combination of software and hardware suitable for specific applications. The hardware may include a general-purpose computer device such as a personal computer, a mobile communication terminal, etc., and a specific computer device suitable for an enterprise, and the computer device may be implemented by devices including memory, a microprocessor, a microcontroller, a digital signal processor, an application-specific integrated circuit, a programmable gate array, a programmable array structure, or combinations thereof.

The computer software, instruction, code, etc., as described above may be stored or accessed by a readable device, and the readable device may include computer components having digital data used for computing for a predetermined period of time, semiconductor storage such as RAM or ROM, permanent storage such as an optical disk, mass storage such as a hard disk, tape, or drum, optical storage such as a CD or DVD, flash memory, floppy disks, magnetic tape, paper tape, independent RAM disks, mass storage removable from a computer, and network-attached storage such as dynamic memory, static memory, variable storage and the cloud. Here, the instructions and code may include all of data-oriented languages such as SQL and dBase, system languages such as C, Objective C, C++, and assembly, architectural languages such as Java and NET, and application languages such as PHP, Ruby, Perl, and Python, but the present disclosure is not limited thereto.

Meanwhile, configurations implementing the technical features of the present disclosure, which are included in the block diagrams and flowcharts shown in the drawings attached hereto, refer to the logical boundaries between the configurations.

However, according to embodiments of software and hardware, depicted arrangements and their functions may be implemented in the form of a stand-alone software module, a monolithic software structure, code, a service, and a combination thereof, and are stored in a medium executable on a computer having a processor capable of executing storage program code, instructions and the like to thus realize the functions thereof, and all such embodiments are also considered to fall within the scope of the present disclosure.

The accompanying drawings and the description related thereto are thus not to be construed as merely explaining the technical features of the present disclosure, and should not be merely inferred, unless a specific arrangement of software for implementing such technical features is explicitly mentioned. That is, it should be understood that various embodiments described above may exist, and such embodiments may be partially modified while retaining the same technical characteristics as those of the present disclosure, and thus they also fall within the scope of the present disclosure.

Moreover, while the flowcharts depict operations in the drawings in a particular order, they are shown for the sake of obtaining the most desirable results, and it should be understood that such operations are not necessarily performed in the specific order shown or in sequential order, or even that all illustrated operations must necessarily be performed. In certain cases, multitasking and parallel processing may be advantageous. Furthermore, the separation of various system components of the embodiments described above should not be understood as requiring such separation in all embodiments, and it should be understood that the program components and systems described may generally be integrated together into a single software product or packaged into multiple software products.

As such, the present specification is not intended to limit the disclosure by the specific terms presented. Although the present disclosure has been particularly shown and described with reference to exemplary embodiments thereof, it is evident that many alternatives, modifications, and variations will be apparent to those skilled in the art.

It will be understood by those skilled in the art that a variety of modifications and variations can be made in the present disclosure without departing from the spirit and scope of the disclosure as defined by the appended claims.

What is claimed is:

1. An apparatus for analyzing membrane fouling of a seawater desalination system, the apparatus comprising:
   a variable reception unit configured to receive variables affecting membrane fouling of a seawater desalination system collected by a plurality of sensors included in the seawater desalination system;
   a memory that includes a variable storage unit configured to store the received variables affecting membrane fouling of a seawater desalination system;
   a processor that includes a dominant variable selection unit configured to select at least one dominant variable among the stored variables by
   performing a multiple linear regression in which each dependent variable (y) of a single feature variable ($x_j$) belonging to a feature matrix (X) of the variables affecting the membrane fouling is determined using a PME (Progressive Model Enhancement) algorithm,
   repeating a process of at least one of sequentially including the variables affecting the membrane fouling in the multiple linear regression until improvement in the multiple linear regression is no longer obtained, and sequentially excluding the variables affecting the membrane fouling in the multiple linear regression until improvement in the multiple linear regression is no longer obtained, and
   determining the improvement based on a change in a likelihood of the multiple linear regression;
   a derivation unit configured to determine a correlation between the selected dominant variable and the membrane fouling; and
   a variable control unit configured to control the seawater desalination system to control the dominant variable.

2. The apparatus of claim 1, wherein the variables include at least one variable measured during an intake process, at least one variable measured after a UF (Ultra Filtration) process, at least one variable measured during a DAF (Dissolved Air Flotation) process, at least one variable measured before an RO (Reverse Osmosis) process, and at least one variable measured after an RO process.

3. The apparatus of claim 1, wherein the processor is configured to select the at least one dominant variable using at least one of SPI (Single-Predictor Identification), PME (Progressive Model Enhancement), BMA (Bayesian Model Averaging), and GA (Genetic Algorithm).

4. The apparatus of claim 1, wherein the processor is configured to select a variable chosen in common by at least two of SPI (Single-Predictor Identification), PME (Progressive Model Enhancement), BMA (Bayesian Model Averaging) and GA (Genetic Algorithm) as the dominant variable.

5. The apparatus of claim 1, wherein the derivation unit is configured to determine the correlation based on a PME algorithm.

6. The apparatus of claim 1, wherein the dominant variable selection unit is configured to select, as an influence variable candidate, a feature variable that has a p-value is lower than a preset significance level ($\alpha$) in a simple regression that describes each dependent variable (y) of a single feature variable ($x_j$) belonging to a feature matrix (X) of the variables affecting the membrane fouling.

7. The apparatus of claim 1, wherein the dominant variable selection unit is further configured to
   apply a penalty to a number of variables contained in a model used by the processor to select the at least one dominant variable using a likelihood-based AIC (Akaike Information Criterion).

8. The apparatus of claim 1, wherein the dominant variable selection unit is configured to
   perform a multiple linear regression in which each dependent variable (y) of a single feature variable ($x_j$) belonging to a feature matrix (X) of the variables affecting the membrane fouling is determined using a BMA algorithm, and
   determine a posterior probability of a model produced by $M_k$, which is any subset of feature variables ($x_1, \ldots, x_{(p+q)}$).

9. The apparatus of claim 1, wherein the dominant variable selection unit is configured to
   perform a multiple linear regression in which each dependent variable (y) of a single feature variable ($x_j$) belonging to a feature matrix (X) of the variables affecting the membrane fouling is determined using a GA algorithm, input a MSE (Mean Squared Error) of a multiple linear regression residual to a fitness function f(•), and repeat a genetic operation process including selection, crossover and mutation in an initial population $M^P=\{M_1, \ldots, M_g\}$.

10. The apparatus of claim 1, wherein the dominant variable selected unit is configured to select the feature variable using each of four algorithms including SPI (Single-Predictor Identification), PME (Progressive Model Enhancement), BMA (Bayesian Model Averaging), and GA (Genetic Algorithm) in order to select a set of feature variables $S_{min}$ and a set of feature variables $S_{max}$, wherein the feature variables $S_{min}$ and the feature variables $S_{max}$ are selected from a set of influence variable candidates $S=(S_{SPI}, S_{PME}, S_{BMA}, S_{GA})$, wherein the selected feature variables $S_{min}$ are included among the influence variable candidates S at least H times, and wherein the selected feature variables $S_{max}$ are included among the influence variable candidates S at least once.

11. A method of analyzing membrane fouling of a seawater desalination system, the method comprising:

a variable reception step of receiving variables affecting membrane fouling of a seawater desalination system collected by a plurality of sensors included in the seawater desalination system;

a variable storage step of storing, in a memory, the received variables affecting membrane fouling of a seawater desalination system;

a dominant variable selection step of selecting, using a processor, at least one dominant variable among the stored variables by performing a multiple linear regression in which each dependent variable (y) of a single feature variable $(x_j)$ belonging to a feature matrix (X) of the variables affecting the membrane fouling is determined using a PME (Progressive Model Enhancement) algorithm, repeating a process of at least one of sequentially including the variables affecting the membrane fouling in the multiple linear regression until improvement in the multiple linear regression is no longer obtained, and sequentially excluding the variables affecting the membrane fouling in the multiple linear regression until improvement in the multiple linear regression is no longer obtained, and determining the improvement based on a change in a likelihood of the multiple linear regression;

determining a correlation between the selected dominant variable and the membrane fouling; and a variable control step of controlling the seawater desalination system to control dominant variable.

12. The method of claim 11, wherein the variables include at least one variable measured during an intake process, at least one variable measured after a UF process, at least one variable measured during a DAF process, at least one variable measured before an RO process, and at least one variable measured after an RO process.

13. The method of claim 11, wherein the determining step includes determining the correlation using at least one of SPI (Single-Predictor Identification), PME (Progressive Model Enhancement), BMA (Bayesian Model Averaging), and GA (Genetic Algorithm).

14. The method of claim 11, wherein the dominant variable selection step includes selecting a dominate variable identified chosen in common by at least two of SPI (Single-Predictor Identification), PME (Progressive Model Enhancement), BMA (Bayesian Model Averaging) and GA (Genetic Algorithm).

15. The method of claim 11, wherein the determining step includes correlating the selected dominant variable and the membrane fouling using a PME algorithm.

16. The method of claim 11, wherein the dominant variable selection step includes performing a simple regression, in which each dependent variable (y) of a single feature variable $(x_j)$ belonging to a feature matrix (X) of the variables affecting the membrane fouling is determined using an SPI algorithm, and when a p-value is lower than a preset significance level ($\alpha$), the feature variable is selected as an influence variable candidate.

17. The method of claim 11, wherein the dominant variable selection step includes applying a penalty to a number of variables contained in a model used by the processor to select the at least one dominant variable using a likelihood-based AIC (Akaike Information Criterion).

18. The method of claim 11, wherein the dominant variable selection step includes performing a multiple linear regression, in which each dependent variable (y) of a single feature variable $(x_j)$ belonging to a feature matrix (X) of the variables affecting the membrane fouling is determined using a BMA algorithm, and determining a posterior probability of a model produced by $M_k$, which includes subset of feature variables $(x_1, \ldots, x_{(p+q)})$.

19. The method of claim 11, wherein the dominant variable selection step includes performing a multiple linear regression in which each dependent variable (y) of a single feature variable $(x_j)$ belonging to a feature matrix (X) of the variables affecting the membrane fouling is determined using a GA algorithm, inputting a MSE (Mean Squared Error) of a multiple linear regression residual to a fitness function f(•), and repeating a genetic operation process including selection, crossover and mutation in an initial population $M^P=\{M_1, \ldots, M_g\}$.

20. The method of claim 11, wherein the dominant variable selection step includes selecting the feature variable using each of four algorithms including SPI (Single-Predictor Identification), PME (Progressive Model Enhancement), BMA (Bayesian Model Averaging), and GA (Genetic Algorithm) in order to select a set of feature variables $S_{min}$ and a set of feature variables $S_{max}$, wherein the feature variables $S_{min}$ and the feature variables $S_{max}$ are selected from a set of influence variable candidates $S=(S_{SPI}, S_{PME}, S_{BMA}, S_{GA})$, wherein the selected feature variables $S_{min}$ are included among the influence variable candidates S at least H times, and wherein the selected feature variables $S_{max}$ are included among the influence variable candidates S at least once.

* * * * *